United States Patent [19]

Taguchi et al.

[11] Patent Number: 4,585,703
[45] Date of Patent: Apr. 29, 1986

[54] METHOD OF TREATING WOODY MATERIAL AND TREATED WOODY MATERIAL

[75] Inventors: Hiroshi Taguchi, Sakai; Tsunehiko Nishimura, Higashiosaka; Nobuo Kobayashi, Kawaguchi, all of Japan

[73] Assignee: Dainippon Ink & Chemicals, Inc., Tokyo, Japan

[21] Appl. No.: 550,606

[22] Filed: Nov. 10, 1983

[30] Foreign Application Priority Data

Nov. 15, 1982 [JP] Japan ............................... 57-199033
Dec. 28, 1982 [JP] Japan ............................... 57-227530

[51] Int. Cl.$^4$ ............................ B32B 9/04; B05D 3/02
[52] U.S. Cl. ..................................... 428/446; 427/386; 427/389.9; 427/391; 427/392; 427/393; 427/393.3; 427/408; 427/440; 428/447; 428/537.1; 428/688; 428/704
[58] Field of Search ................. 427/393, 389.9, 391, 427/392, 393.3, 408, 440; 428/537.1, 446, 447

[56] References Cited

U.S. PATENT DOCUMENTS

| 3,948,842 | 4/1976 | Kraft et al. ................. 427/408 X |
| 4,165,409 | 8/1979 | Maine ............................ 427/393 X |
| 4,247,332 | 1/1981 | Kinoshita et al. ................. 427/393 |
| 4,301,217 | 11/1981 | Rohringer et al. ............. 427/393 X |
| 4,419,401 | 12/1983 | Pearson ......................... 427/393 X |

Primary Examiner—Thurman K. Page
Attorney, Agent, or Firm—Sherman and Shalloway

[57] ABSTRACT

A method of treating a woody material which comprises treating a woody material with a treating agent composed of a mixture or reaction product of a polymeric compound and/or a compound having the ability to form a polymeric compound and a phosphonic acid compound. In an alternative embodiment, the treating agent is composed of (1) a mixture or reaction product of a polymeric compound and/or a compound having the ability to form a polymeric compound and a phosphonic acid compound and (2) at least one member selected from the group consisting of silicon-containing inorganic compounds, magnesium-containing inorganic compounds, calcium-containing inorganic compounds, penetrants, film crack preventing agents, formaldehyde-capturing agents, acid catalysts, antifoamers, mold releasing agents and other fire retardants.

11 Claims, No Drawings

METHOD OF TREATING WOODY MATERIAL AND TREATED WOODY MATERIAL

This invention relates to a novel method of treating a woody material with a mixture or reaction product of a polymeric compound and/or a compound having the ability to form a polymeric compound and a phosphonic acid compound to improve the water resistance, weatherability, rustproofness, water-resistant and solvent-resistant fire retardancy, bug resistance, corrosion resistance and ease of processing of the woody material, and to a woody material so treated.

Heretofore, woody materials to be used outdoors or indoors have been treated not only by surface-coating methods such as brush-coating, spray coating, etc. of various paints, but also by methods involving forcing various chemicals into the woody materials under elevated pressure, reduced pressure, or both. But no method had yet been established which imparts excellent water resistance, weatherability, rust-proofness, water-resistant and solvent-resistant fire retardancy, bug resistance, corrosion resistance, and ease of processing, and is economically advantageous.

It is an object of this invention to impart these properties to woody materials.

According to this invention, this object is achieved by a method which comprises treating a woody material with a treating agent composed of (1) a mixture or reaction product of a polymeric compound and/or a compound having the ability to form a polymeric compound and a phosphonic acid compound, and optionally (2) at least one member selected from the group consisting of silicon-containing inorganic compounds, magnesium-containing inorganic compounds, calcium-containing inorganic compounds, penetrants, film crack preventing agents, formaldehyde-capturing agents, mold releasing agents, acid catalysts, antifoamers, and other fire retardants.

The polymeric compound and/or the compound having the ability to form a polymeric compound, as used in this invention, denotes a compound which can form a coated film, and before application to woody materials, such compounds must be either water-soluble, water-dispersible, organic solvent-soluble, or non-dispersible in water. Specific examples of the polymeric compounds are given in (A) to (J) below. These compounds may be used singly or in combination with each other.

(A) Triazine-type thermosetting resins

A-1. Adducts or condensates of at least one triazine compound such as melamine, benzoguanamine, acetoguanamine, mellon and melam (preferably melamine) and formaldehyde, and alkyl (preferably $C_1$–$C_4$ alkyl) ethers of these compounds.

A-2. Adducts or condensates of formaldehyde and mixed amino compounds composed of the triazine compounds (preferably melamine) mentioned in A-1 above and amino compounds such as urea, thiourea, biuret, dicyandiamide, epsilon-caprolactam or guanidine phosphate in which the proportion of the triazine compound is at least 10% by weight, and alkyl (preferably $C_1$–$C_4$ alkyl) ethers of these adducts or condensates.

A-3. Condensates of formaldedhyde and mixtures of triazine compounds (preferably melamine) and phenol compounds in which the proportion of the triazine compound is at least 5% by weight (preferably at least 10% by weight).

(B) Phenolic resins
Condensates of phenols such as phenol, resorcinol and cresol and formaldehyde.

(C) Xylene resins
Condensates of xylenes and formaldehyde.

(D) Furfural resin
Condensate of furfural and formaldehyde.

(E) Aniline resin
Condensate of aniline and formaldehyde.

(F) Epoxy resins
Epoxy resins and mixtures of these with at least one resin selected from polyamide, polyamine and phenolic resins.

(G) Polyurethane resins (H) Vinyl resins
Polymers of ethylenically unsaturated compounds such as vinyl acetate resin; copolymers of vinyl acetate with acrylic esters, ethylene, unsaturated fatty acids or other polymerizable monomers; vinyl chloride resins; and copolymers of acrylic acid esters and/or methacrylic acid esters and other polymerizable monomers (preferably intramolecularly crosslinked with a difunctional or trifunctional monomer such as diallyl phthalate and having a film-forming temperature of 0° to 30° C.)

(I) Unsaturated polyester resins (J) Alkyd resins (preferably those which have an oil length of not more than 40, and can be baked and cured when used together with such amino resins as exemplified in A-1 and A-2 above, or can be cured by the addition of dryers).

The compound having the ability to form a polymeric compound, as used herein, denotes a partial condensation product between at least one of the above-exemplified triazine compounds, phenolic compounds, xylenes, furfural and aniline and a formaldehyde compound such as formaldehyde, paraformaldehyde or trioxane. Generally preferred is a partial condensate obtained by reacting 1 mole of the former with 0.1 to 10 moles, particularly 0.1 to 8 moles, of the latter. Such a compound is converted to a polymeric compound by heat-treating it to a temperature of, for example, 30° to 100° C. Specific examples of this compound include (K) precursors of the aforesaid triazine-type thermosetting resins, (L) precursors of the aforesaid phenolic resins, (M) precursors of the aforesaid xylene resins, (N) precursors of the furfural resin and (O) precursors of the aniline resin.

Among the above-exemplified polymeric compounds and compounds capable of forming polymeric compounds, compounds (A) and (K) are better than compounds (B), (C), (D), (E), (F), (G), (H), (I), (J), (L), (M), (N) and (O) in regard to economy, water resistance, weatherability, discoloration resistance, and safety against fire. The superiority of the compounds (A) and (K) is also substantiated by the fact that even when they do not require heat treatment, they do not degrade woody materials, and the time of curing them can be easily adjusted depending upon the catalyst used.

The compounds (B), (C), (D), (E), (F), (G), (H), (I) and (J) have their own conditions for producing good results, but in regard to discoloration, offensive odors and economy, the range of application of these compounds is limited as compared with the compounds (A) and (K).

The compounds (L), (M) and (N) have broader ranges of composition or properties. In order to achieve the object of this invention effectively, these polymeric compounds desirably have a minimum of the property of softening, liquefying or flowing even at high temperatures.

The phosphonic acid compounds used in this invention are organic phosphonic acids and their esters, preferably organic phosphonic acid compounds having at least one functional group selected from an amide group, a methylolamide group, an epoxy group and a hydroxyl group. Examples of such phosphonic acid compounds are shown in (a) to (e) below.

(a) Phosphonic acids and their esters such as methyl 3-(dimethylphosphono)propionate, ethyl 3-(dimethylphosphono)-propionate, N,N-dimethylaminoethyl 3-(dimethylphosphono)-2-methylpropionate, N,N-diethylaminoethyl 3-(diphenylphosphono)-2-methylpropionate, dimethyl 3-dimethylphosphonosuccinate, dimethyl diphenylphosphonosuccinate, dimethyl methylphosphonate, diphenyl ethylphosphonate, dimethyl phenylphosphonate, diphenyl phenylphosphonate, di(2-chloroethyl)vinyl phosphonate, tetra(2-chloroethyl)ethane-1,2-diphosphonate, 2-(dimethyl phosphono)butane-1,2,4-tricarboxylic acid-trimethyl ester, 2-phosphonobutane-1,2,4-tricarboxylic acid, 1-hydroxyethane-1,1-diphosphonic acid, nitrilotrimethylenephosphonic acid, phenylphosphonic acid,

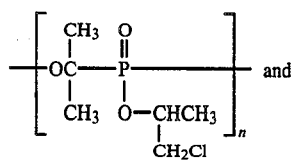

and

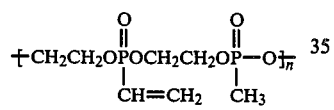

(b) Phosphonic acid compounds containing an amide group, such as 3-(dimethylphosphono)propionamide, 3-(diethylphospono)propionamide, 3-(dibutylphosphono)propionamide, 3-(diisopropylphosphono)propionamide, 3-[bis(2-chloroethyl)phosphono]propionamide, 3-(diphenylphosphono)propionamide, 3-[bis(2,3-dichloropropyl)phosphono]propionamide, 3-(diethylphosphono)-2-methylpropionamide, 3-[2,2-dimethyltrimethylenephosphono]propionamide, 3-(1-methyltrimethylenephosphono)propionamide,

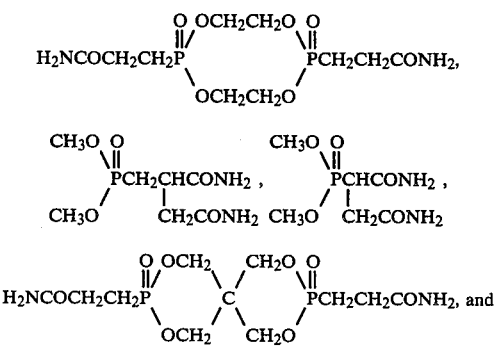

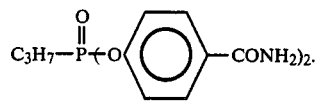

(c) Phosphonic acid compounds containing an amide group or/and a methylolamide group such as N-methylol-3-(dimethylphosphono)propionamide, N-methylol-3-(diethylphosphono)propionamide, N-methylol-3-(dibutylphosphono)propionamide, N-methylol-3-(diisopropylphosphono)propionamide, N-methylol-3-[bis(2-chloroethyl)phosphono]propionamide, N-methylol-3-(diphenylphosphono)propionamide, N-methylol-3-[bis(2,3-dichloropropyl)phosphono]propionamide, N-methylol-3-(diethylphosphono)-2-methylpropionamide, N-methylol-3-[2,2-dimethyltrimethylenephosphono]propionamide, N-methylol-3-(1-methyltrimethylenephosphono)propionamide,

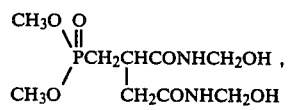

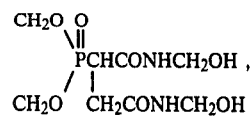

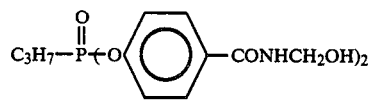

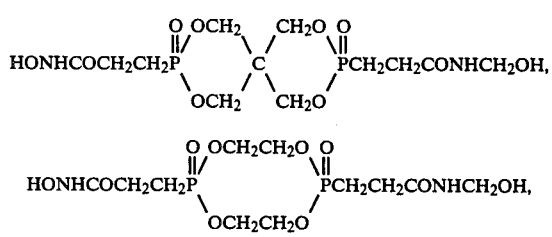

and amide group or/and methylolamide group-containing phosphonic acid compounds obtained by reacting the phosphonic acid amides described in (b) above with formaldehyde or a substance capable of generating formaldehyde.

(d) Phosphonic acid compounds containing a hydroxyl group, such as diethyl bis(2-hydroxyethyl)aminomethylphosphonate, (2-hydroxyethyl) 3-(dimethylphosphono)propionate, (2-hydroxyethyl) 3-(diethylphosphono)propionate, (2-hydroxyethyl) 3-(diisopropylphosphono)propionate, (2-hydroxyethyl) 3-(diphenylphosphono)propionate, (2-hydroxyethyl) 3-(diethylphosphono)-2-methylpropionate, (2-hydroxyethyl) 3-(1-methyltrimethylenephosphono)propionate, diethyl 2,3-dihydroxypropylphosphonate, 1-hydroxyethane-1,1-diphosphonic acid,

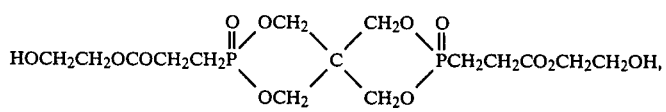

-continued

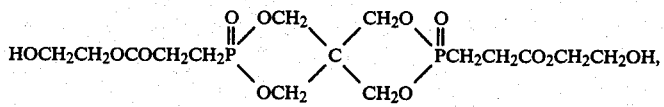

and

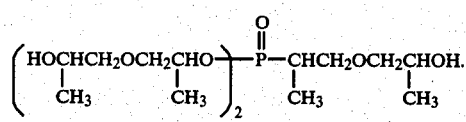

(e) Phosphonic acid compounds containing an epoxy group, such as glycidyl 3-(dimethylphosphono)propionate, glycidyl 3-(diethylphosphono)propionate, glycidyl 3-[bis(2-chloroethyl)phosphono]propionate, glycidyl 3-(diethylphosphono)-2-methylpropionate, glycidyl 3 -(1-methyltrimethylenephosphono)propionate, bis-(2-chloroethyl)epoxypropylphosphonate, diethyl epoxypropylphosphonate,

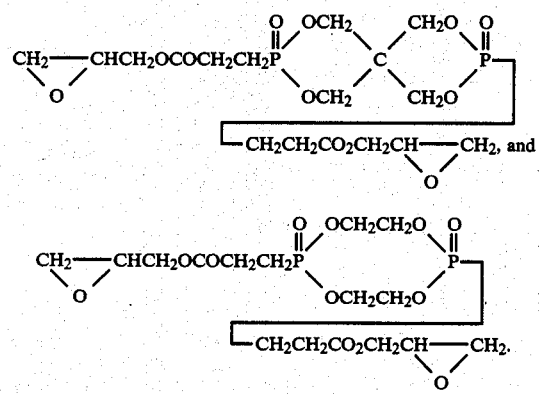

Among them, phosphonic acid compounds having at least one functional group selected from an amide group, a methylolamide group, an epoxy group and a hydroxyl group are especially preferred because when used in combination with the triazine-type thermosetting resins (A) and/or the precursors (K) of the triazine-type thermosetting resins, they give excellent water resistance, weatherability, discoloration resistance, and safety against fire and excellent retention of these properties after immersion in water.

The mixing or reaction ratio of the polymeric compound and/or the compound having the ability to form a polymeric compound and the phosphonic acid compound is such that the latter (as phosphorus) is used in an amount of at least 0.1 part by weight, preferably at least 1 part by weight, more preferably 2 to 60 parts by weight, per 100 parts by weight of the former (calculated as solids).

The treating agent used in this invention is applied in the form of an aqueous solution, an aqueous dispersion, an organic solvent solution or an non-aqueous dispersion. With some kinds of the polymeric compounds, the treating agent can be applied without dilution. The amount of the mixture or reaction product of the polymeric compound and/or the compound having the ability to form a polymeric compound and the phosphonic acid compound in the treating agent is generally from 10 to 90 % by weight, preferably from 20 to 80 % by weight.

In order to impart a higher level of fire retarding property to a woody material and to shorten the after flame time greatly or prevent occurrence of after flame, the treating agent of this invention preferably includes at least one of silicon-containing inorganic compounds, magnesium-containing inorganic compounds and calcium-containing inorganic compounds. Specific examples of these compounds include calcium oxide, calcium sulfate, calcium chloride, calcium nitrate, calcium carbonate, calcium phosphate, calcium hydroxide, calcium pyrophosphate, calcium metaphosphate, calcium dihydrogen phosphate, calcium sulfide, calcium thiosulfate, calcium tungstate, magnesium oxide, magnesium carbonate, magnesium hydroxide, magnesium carbonate hydroxide, magnesium sulfate, magnesium chloride, magnesium bromide, magnesium nitrate, magnesium sulfide, magnesium aluminum oxide, calcium magnesium carbonate, ammonium magnesium sulfate, potassium magnesium sulfate, sodium magnesium sulfate, magnesium phosphate, magnesium hydrogen phosphate, ammonium magnesium phosphate, aluminum aluminosilicate, potassium aluminosilicate, calcium aluminum aluminodisilicate, silicon sulfide, zirconium silicate, silicon carbide, calcium silicate, beryllium aluminum silicate, sodium (meta)silicate, barium (meta)silicate, beryllium (meta)silicate, magnesium (meta)silicate, calcium magnesium (meta)silicate, (meta)silicic acid, sodium tetrasilicate, potassium tetrasilicate, silicon dioxide, potassium (meta)silicate, calcium (meta)silicate, dimagnesium monosilicate, and magnesium aluminum oxide. These compounds may be used singly or in combination with each other or with other inorganic compounds. The amount of these inorganic compounds is 1 to 100 parts by weight, preferably 5 to 50 parts by weight, per 100 parts by weight of the mixture or reaction product of the polymeric compound and/or the compound having the ability to form a polymeric compound and the phosphonic acid compound.

Preferably, a penetrant is included in the treating agent of this invention in order to cause the treating agent to penetrate deeper into a woody material containing much rosin or lipids. Examples of the penetrants include sodium, potassium and ammonium salts of succinic acid ethylene oxide sulfate; sodium, potassium and ammonium dodecylbenzenesulfonates; sodium and potassium salts of lauryl sulfate; 5–8 mole ethylene oxide adducts of alcohols having 8 to 12 carbon atoms; 8–10 mole ethylene oxide/nonyl phenol adducts and nonyl phenol/ethylene oxide and propylene oxide adduct; sodium, potassium and ammonium salts of di-2-ethylhexyl sulfosuccinate, for example AEROSOL OT (a product of Japan Cyanamide Co., Ltd.); anionic or nonionic fluorine-containing surface-active agents such as perfluoroalkylsulfonic acid salts, perfluoroalkylcarboxylic acid salts, perfluoroalkyltrimethylammonium salts, perfluoroalkyl/ethylene oxide adducts, oligomers containing a perfluoroalkyl group and a hydrophilic group, oligomers containing a perfluoroalkyl group and an oleophilic group, urethanes containing a perfluoroalkyl group and an oleophilic group and perfluoroalkylphosphoric acid esters; and anionic or nonionic surface-active agents such as MEGAFAC F-833, MEGAFAC F-812, MEGAFAC F-824, MEGAFAC F-177 and MEGAFAC F-144 (all are products of Dainippon Ink and Chemicals, Inc). Among these penetrants, the salts of di-2-ethylhexyl sulfosucinate and the perfluoroalkyl group-containing surface-active agents are preferred because they increase the penetrability of the treating agent and thereby improve the fire-retardancy or weatherability of a woody material treated. The amount of the penetrant to be incorporated is 0.1 to 10 g, preferably 0.5 to 3 g, per liter of the treating agent.

Preferably, a film crack preventing agent exemplified below is added to the treating agent of this invention in an amount of not more than 20 % by weight, preferably 2 to 10 % by weight, based on the solids of the treating agent. Examples of the crack preventing agent are shown in (i) to (iii) below.

(i) Thermoplastic polyester resins

Products obtained by condensing saturated dicarboxylic acids such as adipic acid, sebacic acid, azelaic acid, terephthalic acid and isophthalic acid or their esters with diols such as ethylene glycol, propylene glycol, butanediol, hexamethylene glycol, diethylene glycol, dipropylene glycol and polyethylene glycol optionally in combination with monocarboxylic acids, monoalcohols, trihydric or higher alcohols or trivalent or higher carboxylic acids. A preferred crack preventing agent is prepared by emulsifying a polyester resin having a molecular weight of 1,000 to 8,000 and containing at least 50 mole %, based on the entire acid component, of a terephthalic acid-type component and/or an isophthalic acid-type component and 5 to 15 % by weight, based on the polymer, of a polyethylene glycol having a molecular weight of 1,000 to 6,000 as the diol component in water in the presence of a water-soluble organic solvent. These polyester resins are used in the form of an aqueous solution, an aqueous dispersion, an organic solvent solution or a non-aqueous dispersion according to the form of the treating agent.

(ii) Acid-curable resins

Products obtained by reacting an acrylic monomer such as methyl (meth)acrylate, ethyl (meth)acrylate, propyl (meth)acrylate, butyl (meth)acrylate, 2-ethylhexyl (meth)acrylate, or decyl (meth)acrylate or a vinyl monomer such as styrene, vinyl acetate, vinyl chloride, ethylene or propylene with 0.1 to 5 % by weight of an unsaturated carboxylic acid such as (meth)acrylic acid, maleic acid or itaconic acid; and oil-free alkyd resins having an acid value of 5 to 20, such as Watersol S-401 and Watersol S-451 (water-soluble oil-free alkyd resins made by Dainippon Ink and Chemicals, Inc.). These resins are usually used in the form of an aqueous solution, and are suitable when the treating agent is in the form of an aqueous solution containing an acid curing agent to be described below.

(iii) Colloidal silica; silica-alumina powder; wood powder; walnut powder; short organic or inorganic fibers having a length of preferably 0.2 to 20 mm, such as nylon fibers, polyester fibers, glass fibers, rockwool and asbestos; iron oxide; titanium oxide; organic disperse pigments such as azo, phthalocyanine and isoindolinone pigments; and aluminum hydroxide.

When the polymeric compound or the compound having the ability to form a polymeric compound in the treating agent contains formaldehyde or a compound capable of generating formaldehyde or is synthesized by using formaldehyde or the formaldehyde-yielding compound, it is preferred to add a formaldehyde capturing agent to the treating agent. Examples of the formaldehyde capturing agent are ethyleneurea, epsilon-caprolactam, dicyandiamide, guanidines such as guanidine carbonate, guanidine hydrochloride, guanidine phosphate or guanidine sulfamate, or mixtures of these compounds with a small amount of urea. By adding the formaldehyde capturing agent, the occurrence of free formaldehyde which is uncomfortable and hazardous to the operating personnel can be prevented. For example, by adding a 40% aqueous solution of ethyleneurea as the capturing agent in a proportion of 10 g/liter to the treating agent tending to generate free formaldehyde, the occurrence of up to about 1,200 ppm of formaldehyde can be prevented. The suitable amount of the formaldehyde capturing agent to be added is 1 to 30 g per liter of the treating agent.

Preferably, a mold releasing agent is added to the treating agent used in this invention. For example, when about 18 kg (about 40 pounds) of 38 to 40 stacked cedar shakes are immersed in the treating agent containing the mold releasing agent, and withdrawn, and without spreading, a film of the treating agent is allowed to form, the adhesion between the treated shakes can be prevented because of the presence of the mold releasing agent. Application of weak vibration to the cedar shakes at this time is preferred because it aids in preventing the adhesion of the treated shakes. A wax or a silicone (such as dimethylpolysiloxane or dimethylhydrogen polysiloxane) or a mixture of these in the form of an emulsion or solution may be used as such a mold releasing agent. The amount of the mold releasing agent is usually 1 to 10 per liter of the treating agent.

When the treating agent is a reactive one, such as a mixture of a triazine-type thermosetting resin and a phosphonic acid compound having a functional group, it is preferred to add an acid catalyst selected from an organic acid, an inorganic acid and their salts, for example acidic phosphoric acid esters which are the reaction products of phosphoric acid, phytic acid or phosphorus pentoxide with a monoalcohol having 1 to 3 carbon atoms, a diol having 2 to 10 carbon atoms or a triol having 2 to 10 carbon atoms in various mole ratios; p-toluenesulfonic acid and its ammonium salt; ammonium chloride; ammonium nitrate, phosphoric acid; hydrochloric acid; nitric acid; or sulfuric acid. Of these, the acidic phosphoric acid esters and p-toluenesulfonic acid are suitable because they show rapid curability and do not cause cracking or foaming in the resulting film.

Since foams may occur in the coated film of the treating agent on a woody material, it is preferred to add an antifoamer to the treating agent. The inclusion of foams in the coated film reduces the weatherability of the film and reduces the fire retarding property of the woody material and also reduces the aesthetic beauty of the woody material. Examples of the antifoamer include lower alcohols such as isopropanol and isobutanol; organic polar compounds such as amyl alcohol, diisobutyl carbitol, tributyl phosphate, oleic acid, tall oil, sorbitan lauric acid monoesters, sorbitan oleic acid triesters, polypropylene glycol and polypropylene glycol derivatives; mineral oils such as NOPCO NDW, NOPCO FOAMASTER 267A and FOAMASTER DF-160L made by Diamond Shamrock Company; and silicones such as ANTIFOAM R-490 made by Dainippon Ink and Chemicals, Inc. The amount of the antifoamer is generally 0.01 to 1.0 g per liter of the treating agent.

Since the phosphonic acid compound is used in preparing the treating agent used in this invention, the treated woody material can meet the fire retardancy as shakes set forth in Class C of ASTM E-108. To improve the fire retardancy further, it is possible to use other fire retardants. Suitable fire retardants include ammonium polyphosphate, guanidine phosphate, tetrabromobisphnol A, an ethylene oxide adduct of tetrabromobisphenol A, hexabromocyclodecane, pentabromomonochlorocyclohexane, 2-chloro-1,2,3,4-tetrabromoethane, hexabromobenzene, and hexachloroendomethylene tetrahydrophthalic acid, all in fine powder form.

The treating agent in accordance with this invention is applied to a woody material so that usually at least 50 g, preferably 100 to 500 g, of the treating agent is retained in the woody material per $m^2$ of the woody material.

The treating agent of this invention is applied to a woody material by various methods, for example dipping, spraying, brush coating, flow coating, or introducing under pressure. After application, the woody material is left to stand at room temperature or at 50° to 200° C., preferably 100° to 180° C., thereby forming a film of the treating agent on the woody material.

The woody material to be treated by the method of this invention includes almost all timbers, plywoods, laminated wood, etc. from cedar, pine tree, Japanese cypress, lauan, beech, oak, etc. These woody materials treated by the method of this invention can be widely used as materials for walls, ceilings, roofs, floors, pillars, shelves, furniture, vehicles, ships, etc. Alternatively, buildings, furniture, vehicles, ships, etc. which have already been built may be treated by the method of this invention.

The following Examples and Comparative Examples illustrate the present invention more specifically. All parts and percentages in these examples are by weight.

EXAMPLE 1

Melamine (252 parts) and 486 parts of 37.2% formalin were reacted at a pH of 10.3. Then, the pH was reduced to 4.0, and 384 parts of methanol was added to etherify the reaction product. The reaction mixture was concentrated under reduced pressure to give 700 parts (yield about 95 %) of a water-soluble trimethylated methylolmelamine resin having a solids concentration of 70%.

The resulting melamine resin (500 parts), 250 parts of a 70% aqueous solution of 3-(dimethylphosphono)propionamide, 10 parts of ammonium chloride as a curing catalyst and 3 parts of sodium salt of succinic acid ethylene oxide sulfate as a penetrant were added to 237 parts of water to prepare 1,000 g of a treating liquid.

The treating liquid was brush-coated on the surface of a cedar plate (made in U.S.; size 15 cm×30 cm×1 cm) at a rate of 250 parts/$m^2$ as solids content, and left to stand at 25° C. for 48 hours to dry and cure it.

The various properties measured are shown in Table 1.

EXAMPLE 2

Example 1 was repeated except that 250 parts of a 70% aqueous solution of N-methylol-3-(dimethylphosphono)propionamide was used instead of 250 parts of the 70% aqueous solution of 3-(dimethylphosphono)propionamide.

The various properties measured are shown in Table 1.

EXAMPLE 3

Melamine (63 parts), 180 parts of urea and 629 parts of 37.2% formalin were reacted at a pH of 10.3. The reaction mixture was dehydrated under reduced pressure to give about 640 parts (yield about 96%) of a melamine urea cocondensate resin having an involatile content of 70 %.

Four hundred parts of the resulting cocondensate resin, 250 parts of a 70% aqueous solution of N-methylol-3-(dimethylphosphono)propionamide, 25 parts of ammonium chloride and 3 parts of a sodium salt of succinic acid ethylene oxide sulfate were added to 322 parts of water to prepare a 1,000 parts of a treating liquid.

Using the resulting treated liquid, the same test as in Example 1 was carried out. The various properties measured are shown in Table 1.

EXAMPLE 4

Example 1 was repeated except that 230 parts of glycidyl 3-(dimethylphosphono)propionate was used instead of 250 parts of the 70% aqueous solution of 3-(dimethylphosphono)propionamide.

The various properties measured are shown in Table 1.

EXAMPLE 5

Example 1 was repeated except that 165 parts of 2-hydroxyethyl 3-(dimethylphosphono)propionate was used instead of 250 parts of the 70% aqueous solution of 3-(dimethylphosphono)propionamide.

The various properties measured are shown in Table 1.

EXAMPLE 6

Example 1 was repeated except that 210 parts of dimethyl (dimethylphosphono)succinate was used instead of 250 parts of the 70% aqueous solution of 3-(dimethylphosphono)propionamide.

The various properties measured are shown in Table 1.

COMPARATIVE EXAMPLE 1

Example 1 was repeated except that 525 parts of a 40% aqueous solution of diammonium phosphate was used instead of 250 parts of the 70% aqueous solution of 3-(dimethylphosphono)propionamide.

The various properties measured are shown in Table 1.

TABLE 1

| Example | 1 | 2 | 3 | 4 | 5 | 6 | Comparative Example 1 |
| --- | --- | --- | --- | --- | --- | --- | --- |
| Time which elapsed until the treating | 14 | 13 | 13 | 7 | 12 | 16 | 1 |

TABLE 1-continued

| Example | 1 | 2 | 3 | 4 | 5 | 6 | Comparative Example 1 |
|---|---|---|---|---|---|---|---|
| liquid became whitely turbid (hours) | | | | | | | |
| Rustproofness of an iron nail (*1) | Small | Small | Small | Small | Small | Small | Large |
| Appearance of the treated timber | Transparent | Transparent | Transparent | Transparent | Transparent | Transparent | Semi-transparent |
| Hardness of the film formed | Hard | Hard | Hard | Hard | Hard | Hard and slightly brittle | Hard and brittle |
| Light resistance (*2) | No discoloration | No discoloration | No discoloration | No discoloration | No discoloration | No discoloration | No discoloration |
| Fire retardancy (*3) | 7 | 7 | 8 | 6 | 6 | 6 | 7 |
| Fire retardancy after immersion in water (*4) | 7 | 7 | 8 | 6 | 6 | 6 | 0 (caught fire) |

Note to Table 1
(*1): A commercial iron nail was coated with the treating liquid and after allowing it to stand in an atmosphere kept at 40° C. and 95% RH for 7 days, the condition of rust formation in the nail was visually observed.
(*2): The treated timber was exposed to a fadeometer for 200 hours, and observed for the occurrence of discoloration.
(*3): The treated timber was maintained at an angle of 30 degrees to the horizontal, and by using a propane gas (mixed with aid) burner, a flame whose length was adjusted to 20 cm and whose top temperature was adjusted to 950 ±50° C. was contacted at its tip with the surface of the treated timber for 2 minutes. Then, the flame was removed. This operation was repeated until the sample caught fire, and the number of the operations required was recorded.
(*4): The treated timber was immersed in a large quantity of water at 20° C. so that the treated surface was submerged under water. It was withdrawn 48 hours later, and forcibly dried at 110° C. for 4 hours. Its fire retardancy was examined by the same procedure as in (*3) above.

EXAMPLES 7 to 12 AND COMPARATIVE EXAMPLE 2

A timber sample having the same size and being of the same material was immersed for 1 hour in each of the treating liquids used in Examples 1 to 6 and Comparative Example 1, withdrawn and then dried at 110° C. for 4 hours, and further heat-treated at 160° C. for 5 minutes. The various properties measured are shown in Table 2.

In the above procedure, the treating liquid of Example 1 was used in Example 7; the treating liquid of Example 2, in Example 8; the treating liquid of Example 3, in Example 9, the treating liquid of Example 4, in Example 10; the treating liquid of Example 5, in Example 11; the treating liquid of Example 6, in Example 12; and the treating liquid of Comparative Example 1, in Comparative Example 2.

TABLE 2

| Example | 7 | 8 | 9 | 10 | 11 | 12 | Comparative Example 2 |
|---|---|---|---|---|---|---|---|
| Occurrence of a foamed layer (*1) | No | No | No | No | No | No | Yes |
| Moisture absorption ratio (*2) | 2.3 | 2.5 | 3.0 | 2.6 | 3.2 | 3.8 | 4.8 |
| Discoloration of the treated timber | No | No | No | No | No | No | No |
| Ant resistance of the treated timber by the ratio of decrease of its mass (%) (*5) | 3.2 | 3.6 | 4.8 | 5.6 | 6.2 | 5.2 | 10.3 |
| Fire retardancy (*3) | 10 | 10 | 12 | 9 | 9 | 8 | 7 |
| Fire retardancy after immersion in water (*4) | 10 | 10 | 12 | 9 | 9 | 8 | 0 (caught fire) |

Notes to Table 2
(*1): In Examples 7 to 12, the treating liquid penetrated uniformly into the inside of the timber and the surface layer became hard. But in Comparative Example 2, the resin foamed to a considerable extent and a brittle resin layer formed on the surface.
(*2): The timber was dried at 107° C. for 2 hours to maintain it in an absolutely dry state, and then allowed to absorb moisture in an atmosphere kept at 20° C. and 95% RH for 48 hours. The ratio of its moisture absorption was then measured. The ratio of moisture absorption of the untreated timber was assumed to be 9.2%.
(*3): Same as (*3) of the footnote to Table 1.
(*4): Same as (*4) of the footnote to Table 1.
(*5): The ratio of decrease of the mass of the treated timber was measured on the basis of Standard No. 11 of Japan Wood Preserving Association.

EXAMPLE 13

Resorcinol (220 parts), 80.6 parts of 37.2% formalin and 110 parts of water were reacted at 80° C. for 3 hours. One hundred parts of the resulting 60% aqueous solution of a resorcinol resin was mixed with 3 parts of a curing catalyst complosed mainly of paraformaldehyde and 10 parts of glycidyl 3-(dimethylphosphono)-propionate to prepare a treating liquid. The treating liquid was brush-coated on a hard beech-tree plate having a thickness of 2 cm for use in high-grade furniture at a rate of 200 g/m² as solids, and dried at room temperature in an atmosphere kept at 30° C. and 70% RH. About 100 minutes later, the surface became non-tacky, and in about 12 hours, curing completely ended.

The coated plate showed a beautiful reddish brown color, and the coated film showed strong resistance to scratching or impact. When this coated plate was subjected to a fire retarding test by the method of (*3) in Table 1, it did not catch fire until the contacting of the flame was repeated 10 times. When it was immersed in water and dried by the method of (*4) in Table 4, its appearance did not at all change, and it did not catch fire until the contacting of the flame was repeated thereafter 10 times.

EXAMPLE 14

A treating liquid was prepared by mixing 100 parts of "POLYLITE NA-281", a product of Dainippon Ink and Chemicals, Inc. which is a Het acid-type unsaturated polyester having a limit oxygen index (L.O.I.) of 30, 1 part of 55% methyl ethyl ketone peroxide as a catalyst and 10 parts of dimethyl (dimethylphoshono)-succinate. The treating agent was coated on a thin lauan plate having a thickness of 5 mm at a rate of 150 parts/m$^2$ as solids, and cured at room temperature.

The properties of the coated plate are shown in Table 3.

COMPARATIVE EXAMPLE 3

Example 14 was repeated except that the treating liquid did not contain dimethyl (dimethylphosphono)-succinate.

The properties of the coated plate are shown in Table 3.

TABLE 3

|  | Example 14 | Comparative Example 3 |
| --- | --- | --- |
| Limit oxygen index of the cured resin | 42 | 30 |
| Fire retardancy (*1) | 39 | Totally burnt |
| Fire retardancy after immersion in water (*2) | 55 | Totally burnt |

(*1): The carbonized area (cm$^2$) was measured in accordance with the 45° Meker burner method and JIS L-1091A-2 method.
(*2): The treated plate was immersed in water at 20° C. for 48 hours, and dried at 110° C. for 5 hours. Furthermore, the treated plate was left to stand at room temperature for 1 hour, and the fire retardancy of the plate was measured by the method of (*1) above.

(*1): The carbonized area (cm$^2$) was measured in accordance with the 45° Meker burner method and JIS L-1091A-2 method.

(*2): The treated plate was immersed in water at 20° C. for 48 hours, and dried at 110° C. for 5 hours. Furthermore, the treated plate was left to stand at room temperature for 1 hour, and the fire retardancy of the plate was measured by the method of (*1) above.

EXAMPLE 15

A treating liquid was prepared by mixing 85 parts of an emulsion in an nonvolatile content concentration of 50% of an anionic copolymer of methyl methacrylate/2-ethylhexyl methacrylate/vinylsilane in a weight ratio of 65/30/5 having a film-forming temperature (M. F. T.) of 26° C., 15 parts of 70% aqueous solution of N-methylol 3-(dimethylphosphono)propionamide, 10 parts of the same melamine resin as used in Example 1 and 0.3 part of ammonium nitrate. The resulting treating liquid was sprayed by an airless spray onto a cedar shake made in U.S. at a rate of 200 g/m$^2$ as solids, dried at room temperature, and then aged at room temperature for 7 days.

The product was subjected to a fire reardancy test in accordance with the testing method of ASTM E 108-80a. It was accepted by the test of class C. After it was subjected to a rain test in the same testing standard to examine its resistance to rain water, it retained a fire retardancy of class C.

EXAMPLE 16

A treating liquid was prepared by mixing 90 parts of a water-soluble polyether urethane type resin (HYDRAN 312B, made by Dainippon Ink and Chemicals, Inc.) having an involatile content of 40%, 10 parts of the same melamine resin as used in Example 1, 12 parts of (2-hydroxyethyl) 3-(diisopropylphosphono)propionate and 0.3 part of ammonium nitrate. The treating liquid was sprayed onto a cedar shingle made in U.S. by an airless spray at a rate of 200 g/m$^2$ as solids, dried at room temperature, and aged at room temperature for 7 days.

The product was subjected to the same fire retardancy test as in Example 15. It was found acceptable in class C, and retained a fire retardancy of class C even after it was subjected to the rain test.

EXAMPLE 17

A treating liquid was prepared by mixing 80 parts of a aminoalkyd resin ("Beckosol M-7652", for use in timbers, a product of Dainippon Ink and Chemicals Co., Ltd.) having an nonvolatile content of 55%, 12 parts of dimethyl bis(2-chloroethylphosphono)succinate, 2 parts of toluene, 2 parts of butanol and 4 parts of para-toluenesulfonic acid as a catalyst. The treating liquid was brush-coated on the surface of a plywood for interior finishing having a thickness of 4 mm at a rate of 250 g/m$^2$ as solids.

At 20° C., the finger touch curing time was 2 minutes, and the curing time was 25 minutes. The product had a pencil hardness of B 2 hours later, F 6 hours later, and H 24 hours later. The coated film was transparent and had a high level of gloss. Even when the coated film was immersed in water for 3 hours, its appearance did not change. It had excellent resistance to alkalies and solvent, and showed good results in a soiling test using marking pens, lipsticks, etc. Furthermore, when this coated film was placed in saturated steam at 60° and 80° C. for 48 hours, the reduction of hardness or gloss was at a very low level.

When this coated plywood was subjected to the same fire retarding test as in Example 1, it did not catch fire until the specified operation was repeated twice.

Example 18

Phenol (188 parts), 252 parts of melamine and 1,613 parts of 37.2% formalin were co-condensed at a reaction temperature of 70° C. and a pH of 10.0 to 10.7 for 6 hours, and dehydrated to give 2,060 parts (yield 94%) of a phenol/melamine cocondensation resin having an nonvolatile content of 47.5%.

To 100 parts of the resulting resin were added 18 parts of glycidyl 3-(diphenylphosphono)propionate and 82 parts of water. The same cedar shake as used in Example 15 was immersed in the resulting treating liquid for 1 hour, withdrawn, dried at 110° C. for 2 hours, and heat-treated at 160° C. for 5 minutes.

The resulting treated shake was exposed outdoors for one year in Bangkok, Thailand. The decrease of the quality of its appearance, and its corrosion were much smaller than in an untreated shake. The moisture absorption of the treated shake decreased to 2.3% (the untreated shake had a moisture absorption of 10.2%). Furthermore, the corrosion of an iron nail hammered into the treated shake was much smaller than in the case of not adding glydicyl 3-(diphenylphosphono)propionate. The treated shake was accepted in class B in a fire prevention test conducted in accordance with ASTM E-108 80a. It was still acceptable in class B even after it had been subjected to the rain test.

EXAMPLE 19

A treating liquid was prepared by mixing 60 parts of a furfural resin having a nonvolatile content of 100%, 8 parts of diphenylphosphonosuccinic diamide, 1 part of p-toluenesulfonic acid as a curing catalyst and 31 parts of water. The treating agent was coated on a cherry tree plate for high-grade furniture having a thickness of 1 cm at a rate of 180 g/m² as solids, and left to stand at room temperature for 3 days to cure it. The surface of the treated plate had formed therein a tough film having large impact strength and a pencil hardness of H.

The coated plate showed water-resistant fire retardancy, and did not catch fire even when a flame of a gas burner at 950° C. was applied to it immediately below it for 4 minutes.

EXAMPLE 20

A treating liquid was prepared by mixing 60 parts of a water-soluble resol-type phenolic resin having an involatile content of 60%, 12 parts of glycidyl 3-(dimethylphosphono)propionate and 128 parts of water. A lauan plywood having a thickness of 10 mm was immersed in the treating liquid, dried at 110° C., and heat-treated at 160° C. for 3 minutes.

The treated plywood had much improved strength, water resistance and corrosion resistance, and showed its suitability as a packing material for precision machines.

EXAMPLE 21

A treating liquid (solids content 42.8%) was prepared by mixing 300 parts of an epoxy resin [Epiclon 153-60T, a product of Dainippon Ink and Chemicals, Inc., an epoxy equivalent of 390 to 410 based on the solids content, a Br content of 46% based on the solids content, solids content 60%], 140 parts of an epoxy curing agent composed mainly of an aliphatic polyamide [Epiclon B-3150, a product of the aforesaid company, an amine value of 150 (based on the solids content), an acid value of not more than 3, a solids content of 70%], 50 parts of reactive glycidyl 3-(dimethylphosphono)propionate, 100 parts of non-reactive dimethyl bis(2-chloroethylphosphono)succinate and 350 parts of toluene. The treating liquid was brush-coated on the same plate as used on Example 1 at a rate of 260 g/m² as solids content, and cured at room temperature for 3 days.

The properties of the coated plate are shown in Table 4.

COMPARATIVE EXAMPLE 4

A plate of the same quality as in Example 21 was coated in the same way as in Example 21 except that a treating agent (solids content 42.8 parts) composed of 486.3 parts of Epiclon 153-60T, 194.6 parts of Epiclon B-3150 and 319.7 parts of toluene was used.

The properties of the coated plate are shown in Table 4.

TABLE 4

| | Example 21 | Comparative Example 4 |
|---|---|---|
| Fire retardancy (*1) | 35 | Totally burnt |
| Fire retardancy after immersion in water (*2) | 48 | Totally burnt |

(*1): Same as (*1) in Table 3.
(*2): Same as (*2) in Table 3.

EXAMPLES 22 to 54

In each run, a treating agent composed of the components shown in Table 5 was coated in a cedar plate made in U.S. in the same way as in Example 1.

The properties of the treated plates are shown in Table 6.

The testing methods for the properties shown in Table 6 are the same as in Table 1 unless otherwise specified.

TABLE 5

| Example | Polymeric compound and/or compound having the ability to form a polymeric compound (parts) | Phosphonic acid compound (parts) | Si—, Mg— or Ca—containing inorganic compound (parts) | Penetrants (parts) | Film crack preventing agent (parts) | Catalyst (parts) | Other additives (parts) |
|---|---|---|---|---|---|---|---|
| 22 | Melamine resin of Example 1 (500) | 70% aqueous solution of 3-(dimethylphosphono)propionamide (250) | Fine powder of magnesium silicate (50) | Sodium salt of succinic acid ethylene oxide sulfate (3) | — | Ammonium chloride (10) | Water (187) |
| 23 | Melamine resin of Example 1 (500) | 70% aqueous solution of N—methylol-3-(dimethylphosphono)-propionamide (250) | Fine powder of magnesium silicate (50) | Sodium salt of succinic acid ethylene oxide sulfate (3) | — | Ammonium chloride (10) | Water (230) |
| 24 | Melamine-urea cocondensate resin of Example 3 (400) | 70% aqueous solution of N—methylol-3-(dimethylphosphono)-propionamide (250) | Fine powder of silicon dioxide (50) | Sodium salt of succinic acid ethylene oxide sulfate (3) | — | Ammonium chloride (25) | Water (272) |
| 25 | Melamine resin of Example 1 (500) | Glycidyl 3-(dimethylphosphono)propionate (230) | Fine powder of magnesium silicate (50) | Sodium salt of succinic acid | — | Ammonium chloride (10) | Water (210) |

TABLE 5-continued

| Example | Polymeric compound and/or compound having the ability to form a polymeric compound (parts) | Phosphonic acid compound (parts) | Si—, Mg— or Ca—containing inorganic compound (parts) | Penetrants (parts) | Film crack preventing agent (parts) | Catalyst (parts) | Other additives (parts) |
|---|---|---|---|---|---|---|---|
| | | | | ethylene oxide sulfate (3) | | | |
| 26 | Melamine resin of Example 1 (500) | Dimethyl dimethylphosphonosuccinate (210) | Fine powder of calcium sulfate/ magnesium metasilicate (weight ratio 20/80) (100) | Sodium salt of succinic acid ethylene oxide sulfate (3) | — | Ammonium chloride (10) | Water (177) |
| 27 | Melamine resin of Example 1 (500) | 70% aqueous solution of 3-(dimethylphosphono)propionamide (250) | Fine powder of silicon dioxide/ magnesium aluminum oxide (weight ratio 50/50) (80) | Sodium salt of succinic acid ethylene oxide sulfate (3) | — | Ammonium chloride (10) | Water (157) |
| 28 | Melamine resin of Example 1 (500) | 70% aqueous solution of 3-(dimethylphosphono)propionamide (250) | Magnesium hydroxide (100) | Sodium salt of succinic acid ethylene oxide sulfate (3) | — | Ammonium chloride (10) | Water (137) |
| 29 | Melamine resin of Example 1 (500) | 70% aqueous solution of 3-(dimethylphosphono)propionamide (250) | Calcium sulfate (90) | Sodium salt of succinic acid ethylene oxide sulfate (3) | — | Ammonium chloride (10) | Water (147) |
| 30 | Melamine resin of Example 1 (500) | 70% aqueous solution of 3-(dimethylphosphono)propionamide (250) | Fine powder of calcium silicate/ aluminum hydroxide (weight ratio 60/40) (50) | Sodium salt of succinic acid ethylene oxide sulfate (3) | — | Ammonium chloride (10) | Water (187) |
| 31 | Melamine-urea cocondensate resin of Example 3 (400) | 70% aqueous solution of 3-(dimethylphosphono)propionamide (250) | Fine powder of calcium sulfate/ aluminum silicate (weight ratio 50/50) (80) | Sodium salt of succinic acid ethylene oxide sulfate (3) | — | Ammonium chloride (25) | Water (242) |
| 32 | 60% aqueous solution of resorcinol resin of Example 12 (100) | Glycidyl 3-(dimethylphosphonopropionate (10) | Fine powder of calcium aluminum silicate (80) oxide (weight ratio 50/50) (80) | — | — | Paraformaldehyde (3) | — |
| 33 | Unsaturated polyester resin of Example 13 (100) | Dimethyl dimethylphosphonosuccinate (20) | Fine powder of zirconium metasilicate/ calcium oxide (weight ratio 60/40) (8) | — | — | 55% MEKPO (*1) (1) 6% cobalt naphthenate (0.5) | — |
| 34 | Anionic copolymer emulsion of Example 14 (70) | Polyphosphonate-type emulsion of Example 14 (30) | Fine powder of aluminum hydroxide/ calcium metasilicate (weight ratio 50/50) (10) | — | — | — | — |
| 35 | Water-soluble polyether urethane resin of Example 15 (60) and Melamine resin of | 2-hydroxyethyl 3-(diisopropylphosphono)-propionate (14) | Sodium silicate (5) | — | — | Ammonium chloride (1) | — |

TABLE 5-continued

| Example | Polymeric compound and/or compound having the ability to form a polymeric compound (parts) | Phosphonic acid compound (parts) | Si—, Mg— or Ca—containing inorganic compound (parts) | Penetrants (parts) | Film crack preventing agent (parts) | Catalyst (parts) | Other additives (parts) |
|---|---|---|---|---|---|---|---|
| 36 | Example 1 (20) Aminoalkyd resin of Example 16 (70) | Dimethyl bis-(2-chloroethylphosphono)-succinate (12) | Fine powder of dimagnesium monosilicate (10) | — | — | p-Toluenesulfonic acid (4) | Toluene (2) Butanol (2) |
| 37 | Phenol/melamine cocondensate resin of Example 17 (100) | Glycidyl 3-(diphenylphosphono)propionate (18) | Sodium silicate (10) | — | — | — | Water (72) |
| 38 | Furfural resin of Example 18 | Diphenylphosphono-succinic acid diamine (8) | Fine powder of magnesium silicate/aluminum oxide (weight ratio 40/60) (10) | | | p-Toluenesulfonic acid (1) | Water (21) |
| 39 | Water-soluble resol-type phenolic resin of Example 19 (60) | Glycidyl 3-(dimethylphosphono)propionate (12) | Fine powder of magnesium hydroxide (20) | — | — | — | Water (20) |
| 40 | Epoxy resin of Example 20 (300) and epoxy curing agent of Example 20 (140) | Glycidyl 3-(dimethylphosphono)propionate (50) Dimethyl bis-(2-chloroethylphosphono)-succinate (100) | Fine powder of potassium aluminum silicate (15) | — | — | — | Toluene (380) |
| 41 | Melamine resin of Example 1 (500) | 70% aqueous solution of 3-(dimethylphosphono)propionamide (250) | — | MEGAFAC F-833 (*2) (10) | — | p-Toluenesulfonic acid (10) | Water (220) |
| 42 | Melamine resin of Example 1 (500) | 70% aqueous solution of N—methylol-3-(dimethylphosphono)-propionamide (250) | — | MEGAFAC F-833 (*2) (10) | acid (10) | p-Toluenesulfonic | Water (230) |
| 43 | Melamine-urea cocondensate resin of Example 13 (250) | 70% aqueous solution of N—methylol-3-(dimethylphosphono)-propionamide (250) | — | MEGAFAC F-833 (*2) (10) | acid (10) | p-Toluenesulfonic | Water (330) |
| 44 | Same as in Example 41 | Same as in Example 41 | — | Sodium salt of di(2-ethylhexyl) sulfosuccinate (3) | — | p-Toluenesulfonic acid (10) | Water (227) |
| 45 | " | Glycidyl 3-(dimethylphosphono)propionate (276) | — | MEGAFAC F-833 (10) | — | p-Toluenesulfonic acid (10) | Water (204) |
| 46 | " | 2-Hydroxyethyl 3-(dimethylphosphono)-propionate (165) | — | MEGAFAC F-833 (10) | — | p-Toluenesulfonic acid (10) | Water (315) |
| 47 | " | Same as in Example 41 | — | MEGAFAC F-833 (10) | Aqueous dispersion of polyester resin (*3) (70) | p-Toluenesulfonic acid (10) | Water (160) |
| 48 | " | " | — | MEGAFAC F-833 (10) | Walnut powder (*4) (20) | p-Toluenesulfonic acid (10) | Water (210) |
| 49 | " | " | — | MEGAFAC F-833 (10) | Colloidal silica (*5) (50) | p-Toluenesulfonic acid (10) | Water (180) |
| 50 | " | Same as in Example 42 | — | MEGAFAC F-833 (10) | — | p-Toluenesulfonic acid (10) | Antifoamer (*6) (0.5) Water (229.5) |
| 51 | " | " | — | MEGAFAC F-833 (10) | Water-soluble acid-curable acrylic resin (*6) (50) | p-Toluenesulfonic acid (10) | Water (230) |
| 52 | " | " | Fine powder of calcium | MEGAFAC F-833 | Water-soluble acid-curable | p-Toluene- | Water (180) |

TABLE 5-continued

| Example | Polymeric compound and/or compound having the ability to form a polymeric compound (parts) | Phosphonic acid compound (parts) | Si—, Mg— or Ca—containing inorganic compound (parts) | Penetrants (parts) | Film crack preventing agent (parts) | Catalyst (parts) | Other additives (parts) |
|---|---|---|---|---|---|---|---|
| | | | silicate/ aluminum hydroxide (weight ratio 60/40) (50) | (10) | acrylic resin (*6) (50) | sulfonic acid (10) | |
| 53 | " | Same as in Example 41 | Fine powder of calcium silicate/ aluminum hydroxide (weight ratio 60/40) (50) | MEGAFAC F-833 (10) | Same as in Example 47 | p-Toluene-sulfonic acid (10) | Water (95), 40% ethylene-urea (10), mold releasing agent (*7) (5) |
| 54 | " | " | Fine powder of calcium silicate/ aluminum hydroxide (weight ratio 60/40) (50) | MEGAFAC F-833 (10) | Same as in Example 47 | p-Toluene-sulfonic acid (10) | Water (80), hexabromobenzene (30) |

Note to Table 5
(*1): Methyl ethyl ketone peroxide
(*2): Anionic fluorine-containing surface-active agent (produced by Dainippon Ink and Chemicals, Inc.)
(*3): Fintex Exp 922, solids content 35% (produced by Dainippon Ink and Chemicals, Inc.)
(*4): Walnut Flour F-180 (produced by Nippon Walnut Co., Ltd.)
(*5): Snowtex ST-O-40, solids content 40% (produced by Nissan Chemical Co., Ltd.)
(*6): Watersol S-451, solids content 50% (produced by Dainippon Ink and Chemicals, Inc.)
(*7): KN-722 (produced by Shin-etsu Silicone Co., Ltd.)

TABLE 6

| Example | Time which elapsed until the treating liquid became whitely turbid (hrs) | Rust formation on an iron nail | Appearance of the treated timber | Hardness of the formed film | Light resistance | Fire retardancy | After-flame property (*1) | Fire retarding after immersion in water | After-flame property after immersion in water (*2) | Condition of the film after immersion in water (*3) |
|---|---|---|---|---|---|---|---|---|---|---|
| 22 | 16 | Small | Transparent | Hard | No discoloration | 7 | A | 7 | A | Slight cracking |
| 23 | 15 | " | Transparent | " | No discoloration | 7 | A | 7 | A | Slight cracking |
| 24 | 15 | " | Transparent | " | No discoloration | 8 | A | 8 | A | Slight cracking |
| 25 | 8 | " | Transparent | " | No discoloration | 6 | A | 6 | A | Slight cracking |
| 26 | 19 | " | Transparent | " | No discoloration | 6 | A | 6 | A | Slight cracking |
| 27 | 19 | " | Transparent | " | No discoloration | 7 | A | 6 | B | Slight cracking |
| 28 | 10 | " | Transparent | " | No discoloration | 6 | B | 5 | C | Slight cracking |
| 29 | 12 | " | Transparent | " | No discoloration | 7 | B | 7 | B | Slight cracking |
| 30 | 15 | " | Transparent | " | No discoloration | 7 | A | 7 | A | Slight cracking |
| 31 | 15 | " | Transparent | " | No discoloration | 8 | A | 8 | A | Slight cracking |
| 32 | — | " | Reddish brown | " | " | 10 | A | 10 | A | Slight cracking |
| 33 | — | " | Transparent | " | " | 6 | A | 6 | A | Slight cracking |
| 34 | — | " | Transparent | " | " | 6 | A | 6 | A | Slight cracking |
| 35 | — | " | Transparent | Soft | Slight discoloration | 7 | A | 7 | A | No cracking |
| 36 | — | " | Transparent | Hard | No discoloration | 3 | B | 3 | C | Slight cracking |
| 37 | 10 | " | Reddish brown | " | No discoloration | 8 | A | 8 | A | Slight cracking |
| 38 | — | " | Reddish brown | " | No discoloration | 7 | A | 7 | A | Slight cracking |
| 39 | — | " | Reddish brown | " | No discoloration | 8 | A | 8 | A | Slight cracking |
| 40 | — | " | Yellowish brown | " | No discoloration | 6 | A | 6 | A | Slight cracking |
| 41 | 17 | " | Yellowish brown | " | No discoloration | 8 | D | 8 | D | Slight cracking |

TABLE 6-continued

| | | | | | | | | | | |
|---|---|---|---|---|---|---|---|---|---|---|
| 42 | 16 | " | Yellowish brown | " | No discoloration | 8 | D | 8 | D | Slight cracking |
| 43 | 17 | " | Yellowish brown | " | No discoloration | 9 | D | 9 | D | Slight cracking |
| 44 | 17 | " | Yellowish brown | " | No discoloration | 8 | D | 8 | D | Slight cracking |
| 45 | 10 | " | Yellowish brown | " | No discoloration | 7 | D | 7 | D | Slight cracking |
| 46 | 14 | " | Yellowish brown | " | No discoloration | 7 | D | 7 | D | Slight cracking |
| 47 | 16 | " | Yellowish brown | " | No discoloration | 8 | D | 8 | D | No cracking |
| 48 | 17 | " | Yellowish brown | " | No discoloration | 8 | D | 8 | D | No cracking |
| 49 | 17 | " | Yellowish brown | " | No discoloration | 8 | D | 8 | D | No cracking |
| 50 | 17 | " | Yellowish brown | " | No discoloration | 8 | D | 8 | D | No cracking |
| 51 | 17 | " | Yellowish brown | " | No discoloration | 8 | D | 8 | D | No cracking |
| 52 | 17 | " | Yellowish brown | " | No discoloration | 8 | A | 8 | A | No cracking |
| 53 | 16 | " | Yellowish brown | " | No discoloration | 8 | A | 8 | A | No cracking |
| 54 | 17 | " | Yellowish brown | " | No discoloration | 10 | A | 10 | A | No cracking |

Note to Table 6

(*1): The flame was contacted with the sample in the same way as in the fire retardancy test, and the after flaming time after removal of the flame was recorded, and the after-flaming property was evaluated on the following scale.

| Evaluation | After-flaming time (seconds) |
|---|---|
| A | 0–10 |
| B | 10–20 |
| C | 20–30 |
| D | more than 30 |

(*2): The treated timber was immersed in a large quantity of water at 20° C. so that the treated surface was submerged under water, withdrawn 48 hours later, and forcibly dried at 110° C. for 4 hours. Thereafter, the after flaming property was examined in the same way as in (*1) above. The evaluation was in accordance with the same scale as in (*1) above.

(*3): The condition of the film during drying in the test of (*2) was observed.

What is claimed is:

1. A method for treating a woody material, which comprises treating the woody material with a treating agent comprising a mixture or reaction product of a triazine-thermosetting resin and a phosphonic acid compound selected from the group consisting of
   (1) methyl 3-(dimethylphosphono)propionate,
   (2) ethyl 3-(dimethylphosphono)propionate,
   (3) N,N-dimethylaminoethyl 3-(dimethylphosphono)-2-methylpropionate,
   (4) dimethyl 3-dimethylphosphonosuccinate,
   (5) dimethyl diphenylphosphonosuccinate,
   (6) dimethyl methylphosphonate,
   (7) 3-(dimethylphosphono)propionamide,
   (8) 3-(diethylphosphono)propionamide,
   (9) 3-(diisopropylphosphono)propionamide,
   (10) N-methylol-3-(dimethylphosphono)propionamide,
   (11) N-methylol-3-(diethylphosphono)propionamide,
   (12) N-methylol-3-(diisopropylphosphono)propionamide,
   (13) N-methylol-3-(diethylphosphono)-2-methyl-propionamide,
   (14) (2-hydroxyethyl)-3-(dimethylphosphono)propionate,
   (15) (2-hydroxyethyl)-3-(diisopropylphosphono)propionate,
   (16) (2-hydroxyethyl)-3-(diethylphosphono)-2-methyl-propionate,
   (17) glycidyl 3-(dimethylphosphono)propionate,
   (18) glycidyl 3-(diethylphosphono)propionate, and
   (19) glycidyl 3-(diethylphosphono)-2-methyl-propionate, 2. A method for treating a woody material, which comprises treating the woody material with a treating agent comprising a mixture or reaction product of a triazine thermosetting resin and a phosphonic acid compound selected from the group consisting of
   (1) methyl 3-(dimethlphosphono)propionate,
   (2) ethyl 3-(dimethylphosphono)propionate,
   (3) N,N-dimethylaminoethyl 3-(dimethylphosphono)-2-methylpropionate,
   (4) dimethyl 3-dimethylphosphonosuccinate,
   (5) dimethyl diphenylphosphonosuccinate,
   (6) dimethyl methylphosphonate,
   (7) 3-(dimethylphosphono)propionamide,
   (8) 3-(diethylphosphono)propionamide,
   (9) 3-(diisopropylphosphono)propionamide,
   (10) N-methylol-3-(dimethylphosphono)propionamide,
   (11) N-methylol-3-(diethylphosphono)propionamide,
   (12) N-methylol-3-(diisopropylphosphono)propionamide,
   (13) N-methylol-3-(diethylphosphono)-2-methyl-propionamide,
   (14) (2-hydroxyethyl)-3-(dimethylphosphono)propionate,
   (15) (2-hydroxyethyl)-3-(diisopropylphosphono)propionate,
   (16) (2-hydroxyethyl)-3-(diethylphosphono)-2-methyl-propionate,
   (17) glycidyl 3-(dimethylphosphono)propionate,
   (18) glycidyl 3-(diethylphosphono)propionate, and
   (19) glycidyl 3-(diethylphosphono)-2-methyl-propionate, and (2) at least one material selected from the group consisting of silicon-containing inorganic compounds, magnesium-containing inorganic compounds, calcium-containing inorganic compounds, penetrants, film crack preventing agents, formaldehyde capturing agents, acid catalysts, antifoamers, mold releasing agents and other fire retardants.

3. The method of claim 1 or 2 wherein the thermosetting resin is a partial condensation product of a formaldehyde-type compound and at least one triazine compound.

4. The method of claim 1 or 2 wherein the proportion of the phosphonic acid compound is at least 0.1 part by weight as phosphorus per 100 parts by weight of the thermosetting resin.

5. The method of claim 1 or 2 wherein the treating agent is in the form of an aqueous solution, an aqueous dispersion, an organic solvent solution, or a non-aqueous dispersion.

6. The method of claim 2 wherein the treating agent includes at least one of the silicon-containing inorganic compounds, magnesium-containing inorganic compounds and calcium-containing inorganic compounds and which is at least one member selected from oxides, sulfates, nitrates, carbonates, phosphates, pyrophosphates, metaphosphates, sulfides, hydroxides, thiosulfates, aluminates and halides of silicon, magnesium and calcium.

7. The method of claim 2 wherein the treating agent includes a penetrant selected from the group consisting of anionic surface-active agents and nonionic surface-active agents.

8. The method of claim 2 wherein the treating agent includes at least one film crack preventing agent selected from the group consisting of thermoplastic polyester resins, acid-curable resins, colloidal silica, silica-alumina powder, wood powder, walnut powder, short organic fibers, short inorganic fibers, iron oxide, titanium oxide, organic disperse pigments and aluminum hydroxide.

9. The method of claim 2 wherein the treating agent includes at least one formaldehyde capturing agent selected from the group consisting of ethyleneurea, urea, epsilon-caprolactam, dicyandiamide and guanidines.

10. The method of claim 2 wherein the treating agent includes at least one mold releasing agent selected from the group consisting of waxes and silicones.

11. A fire-retardant woody material obtained by treatment by the method of claim 1 or 2.

* * * * *